(12) United States Patent
Diamant et al.

(10) Patent No.: US 10,708,241 B1
(45) Date of Patent: *Jul. 7, 2020

(54) HARDWARE SECURITY ACCELERATOR

(71) Applicant: AMAZON TECHNOLOGIES, INC., Seattle, WA (US)

(72) Inventors: Ron Diamant, Albany, CA (US); Nafea Bshara, San Jose, CA (US); Leah Shalev, Zichron Yaakov (IL); Erez Izenberg, Tel-Aviv (IL)

(73) Assignee: Amazon Technologies, Inc., Seattle, WA (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/275,824

(22) Filed: Feb. 14, 2019

Related U.S. Application Data

(63) Continuation of application No. 14/980,664, filed on Dec. 28, 2015, now Pat. No. 10,212,138.

(60) Provisional application No. 62/182,231, filed on Jun. 19, 2015.

(51) Int. Cl.
*H04L 29/06* (2006.01)
*H04L 9/14* (2006.01)

(52) U.S. Cl.
CPC ........... *H04L 63/0428* (2013.01); *H04L 9/14* (2013.01); *H04L 2209/24* (2013.01)

(58) Field of Classification Search
CPC ............. H04L 63/0428; H04L 2209/12; H04L 2209/24; H04L 9/0877; H04L 9/14; H04L 9/3234; H04L 9/3247
USPC ........................................................ 713/160
See application file for complete search history.

(56) References Cited

U.S. PATENT DOCUMENTS

| | | | |
|---|---|---|---|
| 2005/0163121 A1* | 7/2005 | Asano ..................... | H04L 45/00 370/389 |
| 2015/0081726 A1* | 3/2015 | Izenberg ........... | G06F 17/30563 707/755 |
| 2015/0189047 A1* | 7/2015 | Naaman ............ | G06F 17/30545 370/474 |

\* cited by examiner

*Primary Examiner* — Samson B Lemma
(74) *Attorney, Agent, or Firm* — Kilpatrick Townsend & Stockton LLP

(57) ABSTRACT

A hardware security accelerator includes a configurable parser that is configured to receive a packet and to extract from the packet headers associated with a set of protocols. The security accelerator also includes a packet type detection unit to determine a type of the packet in response to the set of protocols and to generate a packet type identifier indicative of the type of the packet. A configurable security unit includes a configuration unit and a configurable security engine. The configuration unit configures the configurable security engine according to the type of the packet and to content of at least one of the headers extracted from the packet. The configurable security engine performs security processing of the packet to provide at least one security result.

20 Claims, 11 Drawing Sheets

HARDWARE SECURITY ACCELERATOR

CROSS-REFERENCE TO RELATED APPLICATIONS

This application is a continuation of U.S. application Ser. No. 14/980,664, filed Dec. 28, 2015, which issued on Feb. 19, 2019 as U.S. Pat. No. 10,212,138, and titled "Hardware Security Accelerator" which claims the benefit of U.S. Provisional Patent Application No. 62/182,231 filed Jun. 19, 2015, and titled "Hardware Security Accelerator," which are incorporated herein by reference in their entirety for all purposes.

BACKGROUND

In today's network environment, many network protocols exist. Often data payloads of communication packets are encrypted according to one of a variety of cipher modes. Encrypted data eventually is decrypted before it can be used. Encryption/decryption engines may be used in this regard and generally each is designed for a particular security protocol—different security protocols thus necessitate the use of different encryption/decryption engines.

BRIEF DESCRIPTION OF THE DRAWINGS

The detailed description refers to the accompanying drawings, in which.

DETAILED DESCRIPTION

Figure 1:
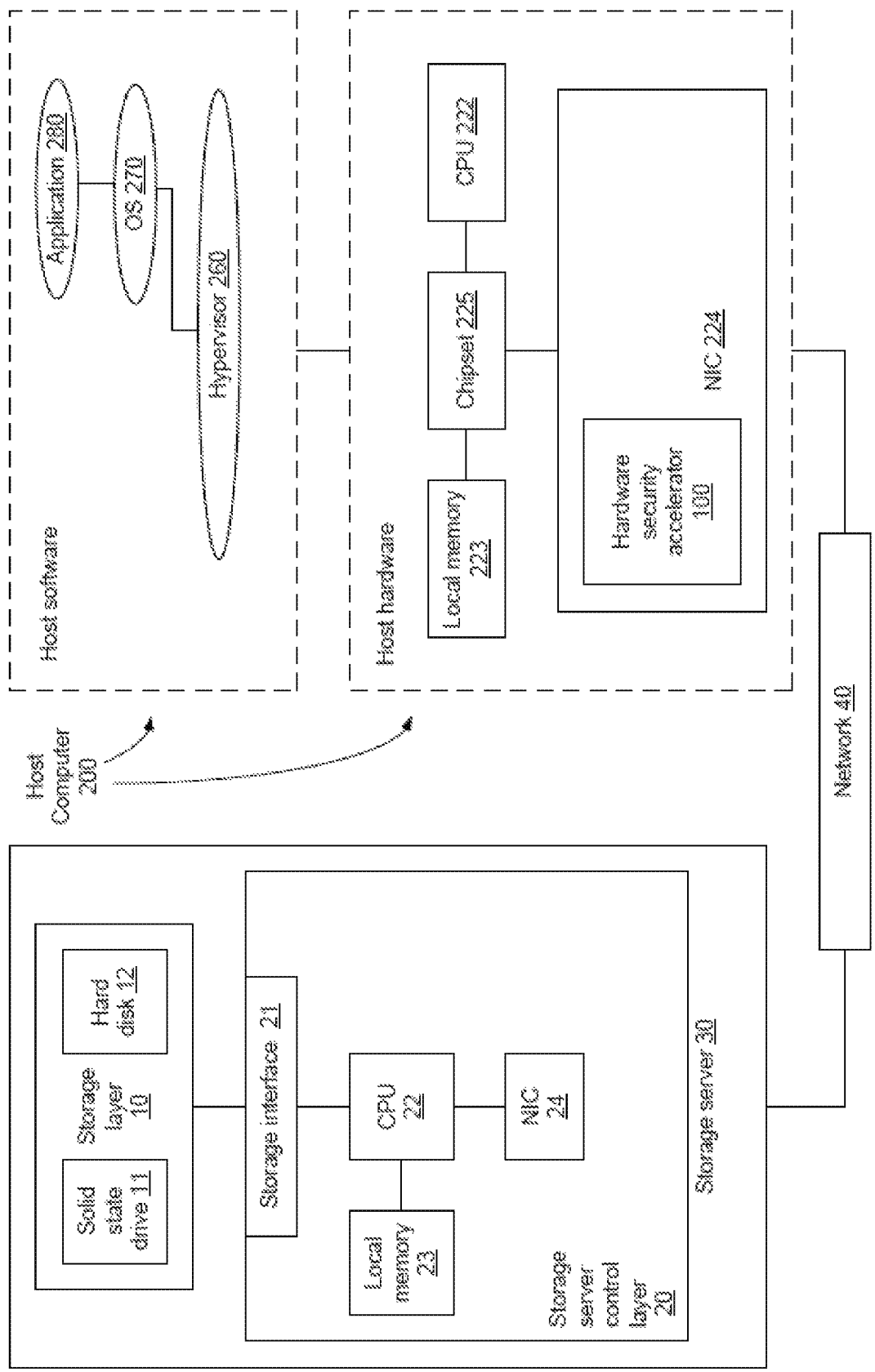
FIG. 1 illustrates the use of a hardware security accelerator to perform security operations on data packets between computers coupled via a network, according to an example of an embodiment of the disclosed principles.

The apparatus and methods described herein include a hardware security accelerator that can provide various security functions such as encryption, decryption, digital signature generation, and digital signature validation. The disclosed hardware security accelerator can support various protocols (standard and/or proprietary), including future protocol extensions and modifications. The hardware security accelerator is configurable to receive a packet, parse the packet's headers (e.g., extract the headers), determine the type of packet based on the parsed packet headers, and perform the necessary decryption and/or encryption and authentication operations required for the protocol(s) of each such packet. The packet may have headers of various layers, with each such header layer associated with a different protocol. Examples of the Open Systems Interconnection model (OSI) layer 4 protocols include the Transmission Control Protocol (TCP) and the User Data Protocol (UDP), etc. Example of the layer 3 protocols include the Internet Protocol version 4 (IPv4), the Internet Protocol version 6 (IPv6), the Internet Protocol Security (IPSec), etc. The layer 2 protocol may include Ethernet (i.e., IEEE 802.2), the Layer 2 Tunneling Protocol (L2TP), etc. The particular combination of protocols used in the headers of a given packet represents the packet "type."

The hardware security accelerator of the disclosed embodiments performs a security operation on a packet. Such security operations may include decryption of an encrypted packet payload as well as encryption of a plaintext (i.e., unencrypted) packet payload. During the decryption process, for example, the hardware security accelerator obtains various security-related parameters based on the determined packet type and decrypts the packet's payload accordingly. Some of the security-related parameters are extracted from the packet itself by the hardware security accelerator based on the packet type, while other security-related parameters (e.g., encryption keys) may be retrieved from a transaction identifier (TID) table. The collection of security-related parameters (some extracted from the packet and others retrieved from the TID table) are provided to a security engine which uses the parameters to decrypt the encrypted payload. A similar process may be performed to encrypt a plaintext packet payload.

The hardware security accelerator is configurable and, as such, can extract various fields of information from the packet's headers that are needed to perform the security operation and do so based on the specific protocols of each such packet. The particular information fields that are extracted are specific to the particular packet type (i.e., the particular combination of protocols of the headers). Thus, one packet type may cause the hardware security accelerator to extract one set of information fields to decrypt the payload, while a different packet type may cause the accelerator to extract a different set of information fields for decryption purposes. The disclosed embodiments of the hardware security accelerator and associated methods may optimize security on both stream-based and block-based data traffic. Further, the hardware security accelerator is usable to support various security protocols and support proprietary protocols and packet formats. In some embodiments, the hardware security accelerator is usable to create a high performance, scalable, storage security scheme, and to support extensions of existing protocols.

The hardware security accelerator described herein is configurable to permit it to analyze the headers of a given packet and determine the particular combination of protocols of the headers. The protocols determined by the accelerator may be standard protocols or proprietary protocols. The hardware security accelerator may be configured to analyze certain bit fields within the header to determine the protocols that are present. The particular bit fields that are examined by the hardware security accelerator are configurable. Further, the security operation performed by the hardware security accelerator (encryption, decryption, signature generation, signature validation, etc.) also is configurable for each particular set of protocols that the hardware security accelerator is configured to detect.

FIG. 1 illustrates multiple electronic systems coupled together via a network 40. In the particular example of FIG. 1, one electronic system is a host computer 200 and the other electronic system is a storage server 30. However, the principles described herein can be applied to other types and combinations of electronic systems. For example, the data described herein as being stored in encrypted form may be stored on the storage server 30, or on a different type of storage device or storage system. The storage server 30 may be coupled to multiple host computers 200 via one or more network s 40. The storage server 30 has a storage layer 10 and a storage server control layer 20. The storage layer 10 may include any number and types of permanent (i.e., non-volatile) storage devices such as a solid state drive (SSD) 11 and a hard disk (HD) 12. The storage server control layer 20 includes a network interface card (NIC) 24, a central processing unit (CPU) 22 (or multiple CPUs), local memory 23 (e.g., random access memory) and a storage interface 21. NIC 24 provides an interface between the storage server 30 and network 40. Storage interface 21 provides an interface between the storage and control layers 10 and 20. The CPU 22 may be coupled to the NIC 24, local memory 23 and storage interface 21 as shown, or coupled via other configurations.

The host computer 200 includes hardware components such as local memory 223, chipset 225, CPU 222 and NIC 224. In the particular embodiment of FIG. 1, NIC 224 includes a hardware security accelerator 100. Chipset 225 may bridge together local memory 223, CPU 222 and NIC 224. The host computer 200 hosts software components such as an operating system (OS) 270 and one or more applications 280. The application 280 can perform any desired functions. One function that may be performed by application 280 is to store data in, and read data from, the storage server 30. In some embodiments, one or more virtual machines may be hosted on the host computer and, as such, a hypervisor 260 may be included to implement the virtual machine.

The hardware security accelerator 100 may perform one or more security processing operations. In some embodiments, the data to be transmitted across the network and stored in the storage server 30 may be encrypted by the hardware security accelerator 100. Upon reading data (which may be encrypted) from the storage server 30, the hardware security accelerator 100 may decrypt the data before providing the corresponding plaintext data to the application 280. Thus, the hardware security accelerator 100 performs ciphering operations on data including encryption and/or decryption of such data.

As noted above, a function performed by the host computer 200 (e.g., by application 280) is to store data on the storage server 30. Data may be provided from the host computer 200 to the storage server 30 in the form of packets. A write operation of a packet to the storage server 30 may include the application 280 generating a packet to be saved and temporarily saving the packet to local memory 223 pending transmission of the packet by the NIC 224 to the storage server. A client driver (which may be included in OS 270) may configure the NIC 224 to encrypt the packet's data payload and to cause the packet to be sent to the storage server 30. NIC 224 responds by fetching the packet from the local memory 223, performing encryption (by hardware security accelerator 100) to generate an encrypted packet and sending the encrypted packet to the storage server 30 through network 40. The storage server's NIC 24 receives the packet and stores it in its local memory 23. The CPU 22 then retrieves the packets from local memory 23 and sends the packets through the storage interface 21 to the storage layer 10 for storage in the SSD 11 and/or HD 12.

For packets whose data payloads are encrypted by the hardware security accelerator, the NIC 224 may store various cryptographic parameters in local memory 223 to subsequently be used to decrypt the data payload when the packet is eventually read back by the host computer 200. The cryptographic parameters that may be stored pending their use in subsequently decrypting the packet include one or more encryption keys, a cipher mode, etc.

A read operation of an encrypted packet containing encrypted data may include the application 280 generating a request to read a packet that is stored in the storage server 30. A client driver (may be included in OS 270) configures the NIC 224 to send the read request to the storage server 30. The OS 270 stores the read request in the local memory 223. The NIC 224 fetches the read request from the local memory 223, and sends the read request to the storage server 30 through network 40. The network 40 passes the read request to the storage server 30. The storage server's NIC 24 receives the read request, and causes the read request to be stored in local memory 23. CPU 22 in the storage server 30 determines the address from the packet from which to read the requested data, determines the size of the data to be read, and reads the relevant encrypted data from SSD 11 or HD 12, and stores the retrieved encrypted packet (i.e., packet with an encrypted data payload) in local memory 23. The NIC 24 retrieves the encrypted packet from local memory 23 and sends the encrypted packet to the host computer 200 via network 40. NIC 224 in the host computer 200 receives the encrypted packet from the network 40 and fetches the internally stored cryptographic parameters (which were previously stored such as when writing the encrypting packet in the first place or when the host computer submitted the read request). The relevant set of cryptographic parameters may be identified using a packet type identifier and/or a TID. The packet type identifier may be determined based on the particular combination of protocols of the packet's headers and the TID may be parsed from the packet. The hardware security accelerator 100 decrypts the packet's data payload and stores the plaintext version of the packet in local memory 223. Through the hypervisor 260 and/or OS 270, the application 280 may access the local memory 223 to retrieve the plaintext data. The hardware security accelerator 100 essentially combines the functionality of in-band encryption/decryption with remote direct memory access (RDMA). That is, the hardware security accelerator 100 can read encrypted data from the storage server 30, decrypt the retrieved encrypted data, and store the resulting plaintext data into the host computer's local memory 223 without having to temporarily store the data elsewhere pending the decryption process. The same principle is true when encrypting and writing encrypted data to the storage server 30 (termed "cut-through mode").

Figure 2:
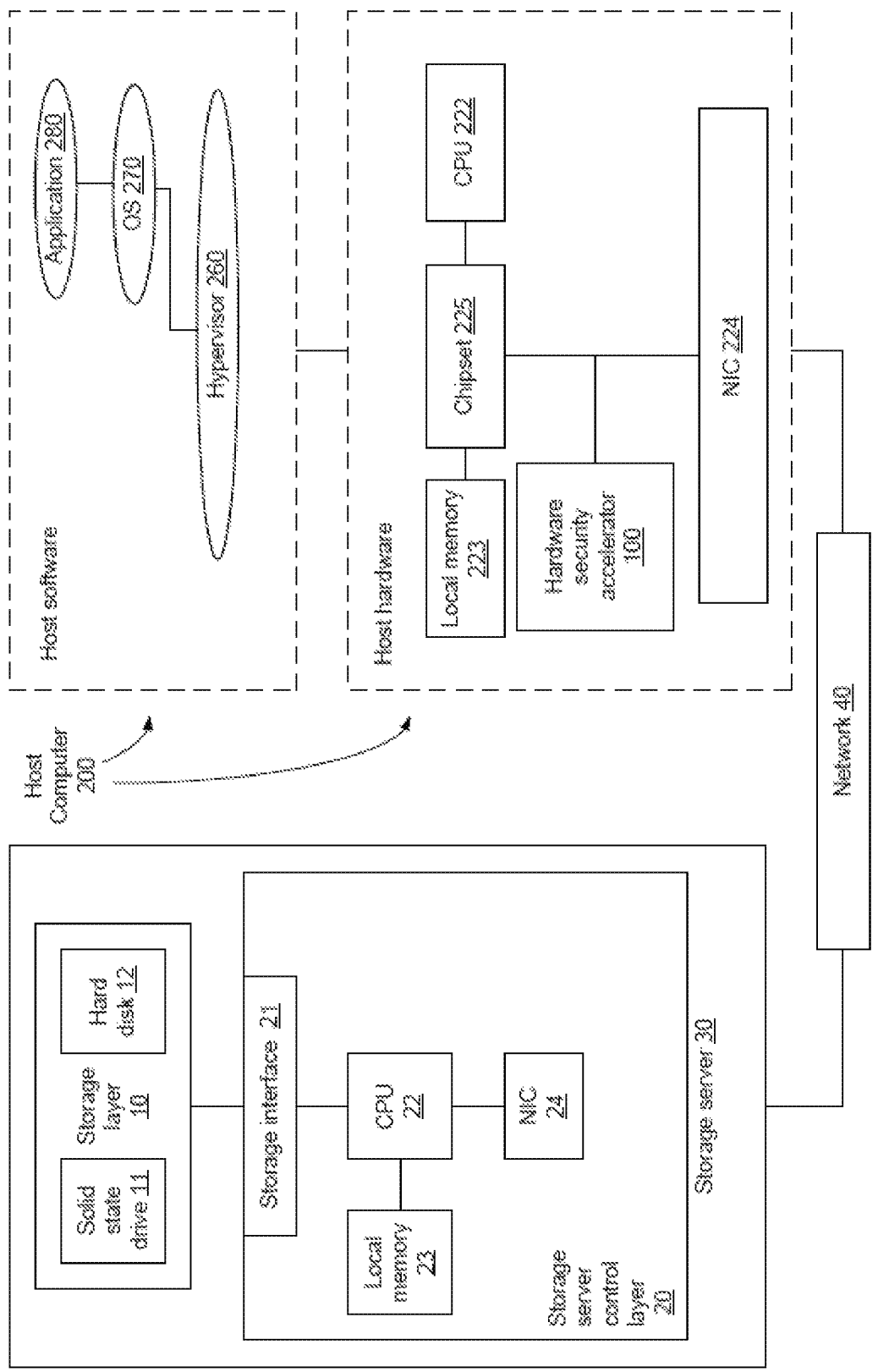
FIG. 2 shows another example of the use of the hardware security accelerator according to another embodiment.

The embodiment of FIG. 2 is similar to that of FIG. 1. A difference is that the hardware security accelerator 100 of the host computer 201 of FIG. 2 is coupled to the NIC 224, and is not included in NIC 224. Otherwise, the encryption and decryption of data and storage in and retrieval from the storage server 30 works in much the same way as that described above with regard to FIG. 1.

Figure 3:
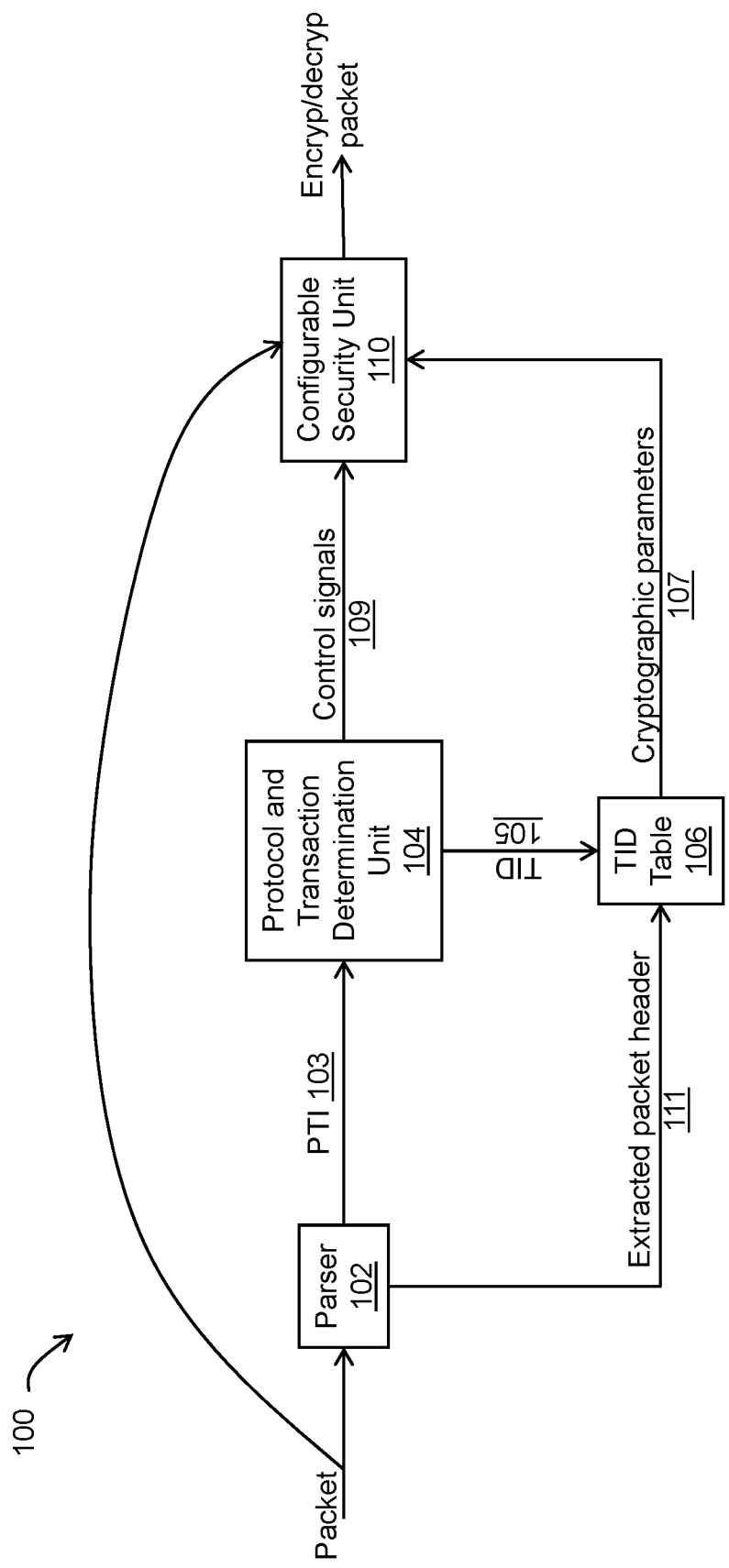
FIG. 3 shows an example of a block diagram of the hardware security accelerator in accordance with various embodiments.

FIG. 3 illustrates an embodiment of the hardware security accelerator 100. The illustrative embodiment of hardware security accelerator 100 includes a parser 102, a protocol and transaction determination unit 104, a transaction identifier (TID) table 106, and a configurable security unit 110. These and all other "units" discussed herein include electrical circuits or other forms of hardware. The configurable security unit 110 can cipher packets including both encrypting and decrypting packets. To decrypt a packet, the parser 102 receives a packet with an encrypted data payload. The packet includes one or more headers that assist the routing of the packet from the source to the destination, and includes one or more security parameters that are usable to decrypt the packet. Each header may be associated with a particular protocol. Each packet thus may include any one of a number of various combinations of protocols. The parser 102 includes a programmable set of protocols and the parser determines whether the packet includes any of its programmable set of protocols. The parser 102 parses the headers of the packet to determine the various protocols encoded in the headers. The particular combination of header protocols defines the type of packet being parsed by the parser 102. The parser 102 may be implemented as or at least include a content addressable memory (CAM) which includes multiple entries. In one example, the CAM of the parser includes 32 entries. Each entry contains, at least in part, identities of a particular combination of protocols and a packet type identifier (PTI) for each particular protocol combination. The various protocols of the headers also define the length of each header and, from the lengths, the offset from the beginning of the packet to the data payload of the packet also can be determined. In other embodiments, the parser 32 may include a type of memory configuration different than a CAM for storing the combinations of protocols and PTIs.

The parser 102 accesses the CAM using the particular set of protocols identified in the headers to thereby retrieve the PTI for that combination of protocols. The PTI 103 may be provided to the protocol and transaction determination unit 104, which itself includes a protocol table that can be indexed using the PTI 103. In some embodiments, the protocol table of the protocol and transaction determination unit 104 maps PKIs to at least some of the security parameters needed by the configurable security unit 110 to decrypt the packet's payload. The security parameters included in the protocol table of the protocol and transaction determination unit 104 are accessed and used to generate control signals 109. The control signals 109 are provided to the configurable security unit 110 which uses the control signals during the ciphering process (encryption or decryption). For example, a control signal 109 may indicate to the configurable security unit 110 how to generate an initialization vector for the encryption/decryption algorithm. In such cases, the control signal may indicate the offsets to, and lengths of, the various portions of the packet's headers that may be retrieved and concatenated or otherwise combined together to form the initialization vector.

The protocol and transaction determination unit also generates a TID 105. Packets transferred back and forth, for example, between host computer 200 and storage server 30 may be part of a common "transaction" (or a "connection") which may be uniquely defined by a TID 105. In some embodiments, the TID is included as a field within one or more of the headers of the packet. The specific bits within the headers that contain the TID 105 may be protocol specific. That is, for one particular combination of protocols, the TID 105 is specified in certain bits of the packet headers, while for another combination of protocols, the TID may be specified in other bits of the packet headers. The PTI 103 is indicative of the particular protocols, and based on the particular protocols implemented in the packet, the protocol and transaction determination unit 104 obtains the particular subset of bits from the packet headers that include the TID 105.

The TID 105 is provided by the protocol and transaction determination unit 104 to the TID table 106, along with one or more headers 111 extracted form the packet by the parser 102. The TID table 106 maps TIDs and one or more fields from the extracted headers to cryptographic parameters. The cryptographic parameters 107 associated with the particular TID 105 are retrieved from the TID table 106 and provided to the configurable security unit 110. The cryptographic parameters 107 provided to the configurable security unit 110 may include those security parameters needed to cipher (encrypt or decrypt) the packet, which are not otherwise provided by the protocol and transaction determination unit 104. An example of such security parameters retrieved from and provided by the TID table 106 to the configurable security unit 110 include encryption keys. The encryption key necessary to decrypt a packet of a particular transaction would not be stored as part of the packet itself and instead is stored in the TID table 106 when the hardware security accelerator 100 encrypted the packet in the first place. Thus, the TID 105 is recovered or otherwise generated and used to retrieve the appropriate encryption key usable to decrypt the packet.

Figure 4:
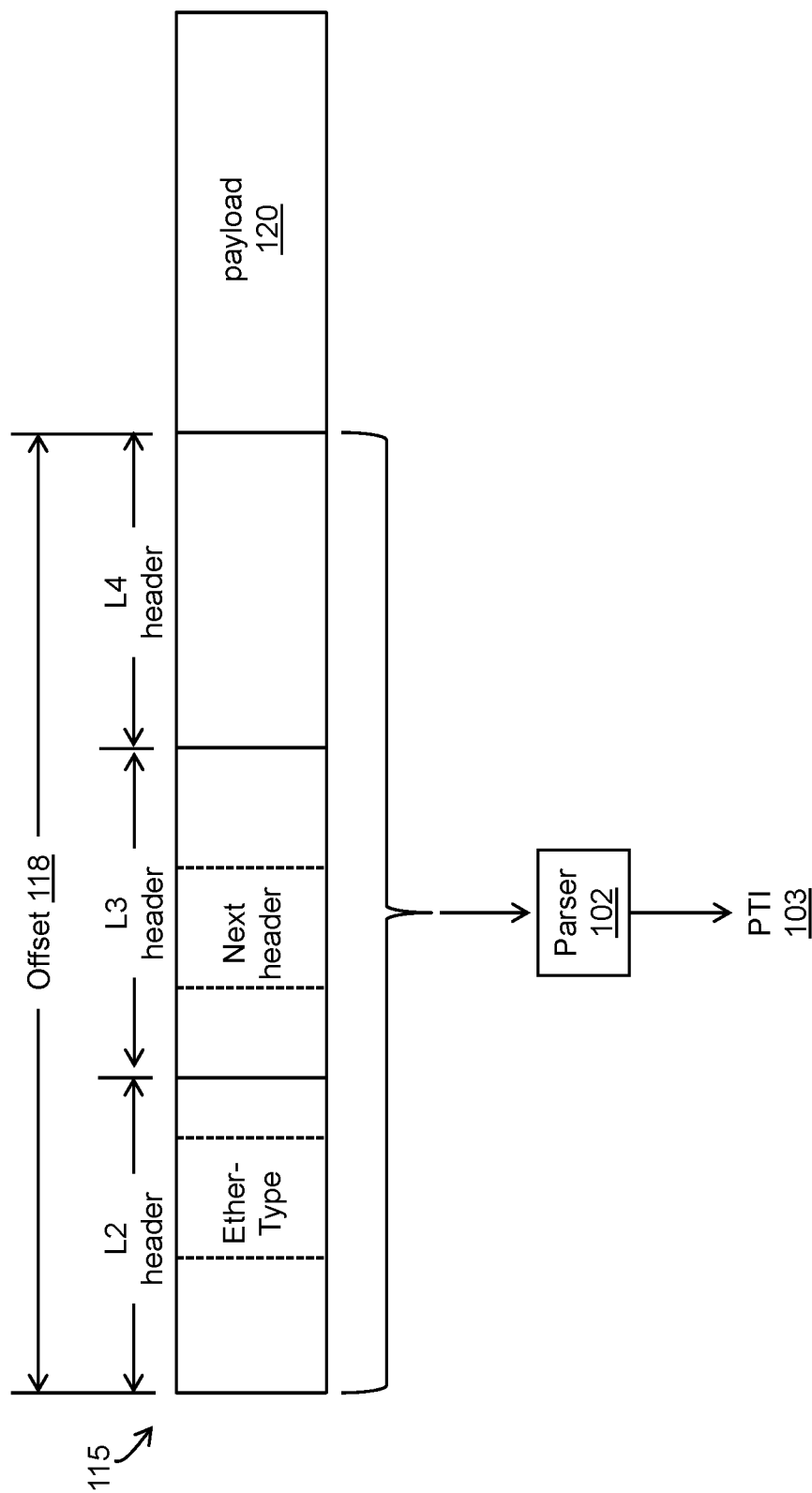
FIG. 4 illustrates an example of a packet format including headers that are to be parsed by a parser of the hardware security accelerator in accordance with various embodiments.

FIG. 4 shows an example of a packet 115. The packet 115 in some embodiments may include a layer 2 (L2) header, a layer 3 (L3) header, a layer 4 (L4) header, and a data payload 120. To the extent the packet is encrypted by the hardware security accelerator 100, in some embodiments, it is the payload 120 that is encrypted by the hardware security accelerator. During the decryption process, the encrypted payload is decrypted by the hardware security accelerator 100. Layer 2, according to the OSI model is the data link layer and examples of the protocols applicable to the L2 header may include IEEE 802.2 (Ethernet), the L2TP protocol, and the Point-to-Point Protocol (PPP). Layer 3 is the network layer and examples of the protocols applicable to the L3 header may include IPv4, IPv6, IPSec, AppleTalk, and Internet Control Message Protocol (ICMP). Layer 4 is the transport layer and examples of the protocols applicable to the L4 header may include TCP and UDP. Each header thus may specify a different protocol out of multiple possible protocols and thus packets may have a variety of combinations of protocols. For example, one packet may be a TCP over IPv4 over Ethernet packet, while another packet is a UDP over IPv6 over Ethernet packet. Other combinations are possible as well and different or additional protocols besides those listed above are also possible.

The parser 102 analyzes the L2-L4 headers of the packet 115 and determines the protocols applicable to each layer's header. In some embodiments, a header may include a bit field that identifies the protocol of the next higher layer header. For example, a layer 2 Ethernet packet includes an EtherType field which is a two-octet field that indicates which protocol is encapsulated in the layer 3 header. For example, an EtherType of 0x0800 refers to IPv4 and an EtherType of 0x86DD refers to IPv6. Layer3 IPv4 and IPv6 headers include a Next Header field which indicates the protocol of the next higher layer. For example, a Next Header value of 0x06 refers to TCP, while a Next Header value of 0x11 refers to UDP. The parser 102 performs an iterative analysis on the headers starting with the lowest layer's header (e.g., layer 2) and, from that, identifies the next highest layer protocol. Once the next higher layer's protocol is determined, the parser then knows the format of that header and is able to access the particular bit field in that header that encodes the protocol of the next higher layer's protocol. For example, if the analysis of EtherType field in the Ethernet header contains a value of 0x0800, then the parser 102 knows that the layer 3 protocol is IPv4 and, as a result, extracts the bits from the layer 3 header which correspond to the Next Header field of an IPv4 header (e.g., the first octet of the layer 3 header). The Next Header field of the IPv4 header may contain a value of 0x06 which the parser is configured to map to the TCP protocol.

One or more of the protocols identified in the headers may impact how a packet is to be ciphered. The hardware security accelerator 100 is flexible enough so as to determine the appropriate manner for ciphering a packet based on the particular protocols encoded into the packet. Thus, the hardware security accelerator 100 can be used to cipher different types of packets (i.e., having different mixes of protocols).

As well as determining the various protocols of the packet's headers, the parser 102 also computes the offset from the beginning of the packet to the beginning of the payload, as indicated by offset 118 in FIG. 4. Each protocol may correspond to a header of a particular length and the lengths of each such header are programmed into the parser 102. The parser 102 retrieves the lengths after determining the particular protocols and sums the lengths together to compute the offset 118. The offset is a value that may be provided through the protocol and transaction determination unit as a control signal 109 to configurable security unit 110. Thus, the configurable security unit 110 can determine where in the packet to begin the encryption or decryption process, that is, which bit corresponds to the beginning of the payload 120.

Figure 5:
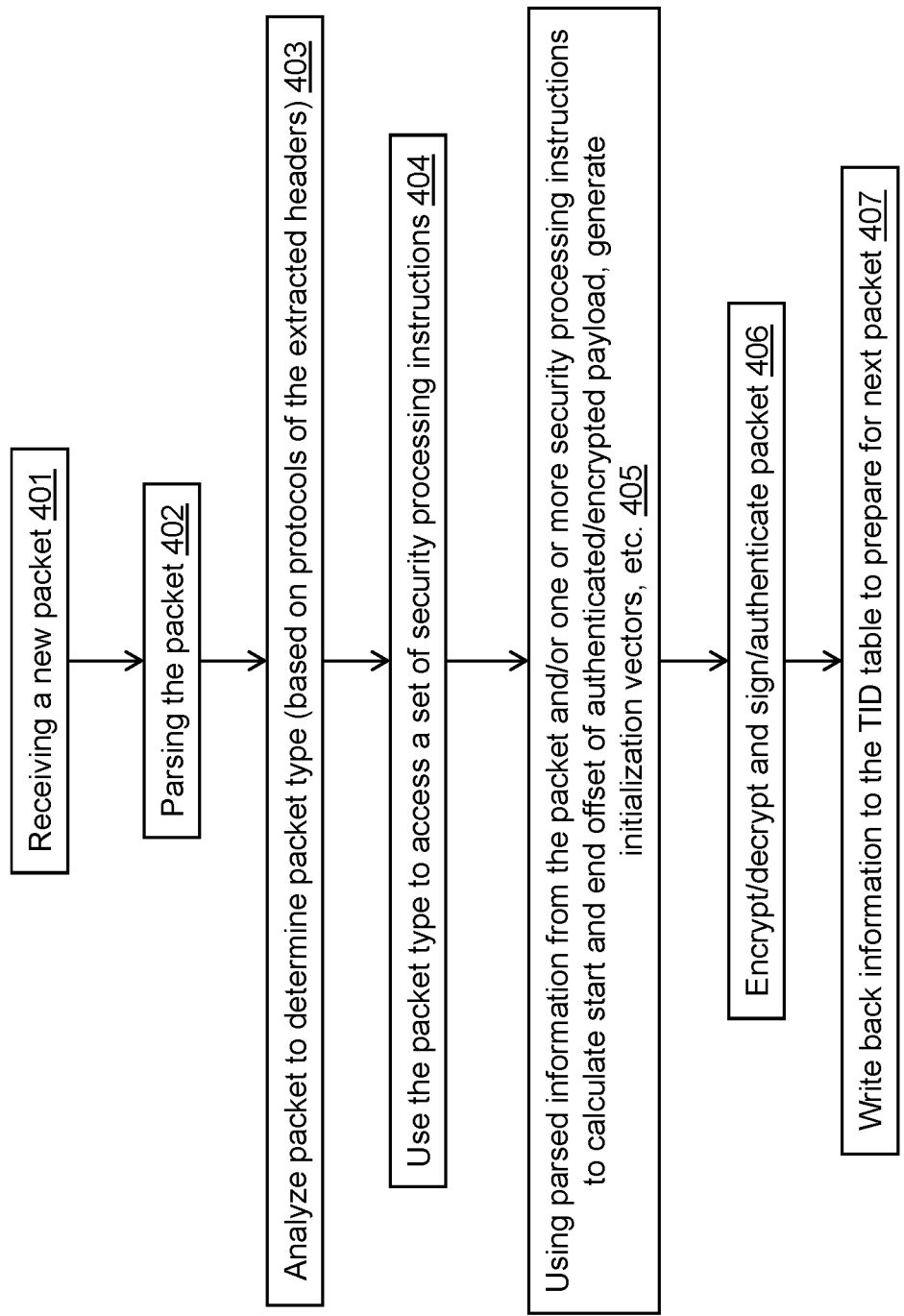
FIG. 5 illustrates a method according to an illustrative embodiment of the disclosed principles.

FIG. 5 illustrates a method 400 according to a further illustrative embodiment. The operations may be performed in the order shown or in a different order. Further, the operations may be performed sequentially, or two or more of the operations may be performed concurrently.

At 401, the method includes receiving a packet. In some embodiments, the packet is received by the hardware security accelerator 100. The packet received may be a packet to be decrypted or encrypted. For example, the packet may have been stored on storage server 30 with encrypted data (or in plaintext, that is, not encrypted) and the packet is now being read back by the host computer 200. The packet is retrieved from the storage server 30 over network 40 and received by the hardware security accelerator 100. The encrypted data payload of the packet is to be decrypted by the hardware security accelerator 100 before being returned to the application 280 that requested the data in the first place. If the packet's payload was stored in plaintext, the hardware security accelerator nevertheless may operate to validate a digital signature in the packet.

At 402, the method includes parsing the packet. Parsing the packet may be performed by parser 102 to detect the protocols of the packet's headers (e.g., the L2/L3/L4 protocols). In some embodiments, such as those described above, a given header (e.g., L2 or L3 header) may contain an identification of the next higher layer's protocol. The parser 102 examines the L2 header and determines the protocol of the L3 header. Now that the parser 102 is informed of the particular protocol of the L3 header, the parser is able to determine which bits in the L3 header contain the Next Header field which encodes the protocol of the L4 header. The parser 102 examines that field to determine the protocol of the L4 header.

Some packets may be encapsulated with an outer set of headers. Encapsulating the packet enables the packet to be tunneled. Thus, parsing the packet also may include detecting whether the packet is encapsulated and, if it is, detecting the various L2/L3/L4 protocols of the inner and outer packets. Further, the offsets and lengths of all headers are extracted during the parsing process.

Based on the protocols of the extracted headers, at 403 the method includes detecting the packet type. Detecting the packet type may include accessing the parser's CAM to retrieve the PTI associated with the particular combination of L2/L3/L4 protocols. The PTI may be a numeric value which, in turn, may be used as an index into other data structures such as the TID table 106.

At 404, the method includes using the packet type (e.g., the PTI 103) to access a set of security processing instructions. The security processing instructions may be stored in the protocol and transaction determination unit 104. The security processing instructions may include information on how to extract specific header fields in order to construct a TID. The TID may be used, for example, to access a TID table that may contain cryptographic parameters such as encryption/authentication algorithm and mode, cipher keys, next expected logical block address (LBA) or replay-protection counter related to the transaction.

At 405, the method includes using the parsed information from the packet and/or one or more security processing instructions in order to calculate start and end offsets of payload, generate an initialization vector for the ciphering process, and other such ciphering-related information. For example, a security processing instruction may specify that the initialization vector is to be computed as a concatenation of specific bit fields within certain of the packet's headers. The configurable security unit 110 may perform operation 405. Further, the start and end offsets to the data payload to be encrypted or decrypted can be determined by the security processing instructions. The start and end offsets may be included in a header field, or may be determined based on the length of the header itself, and extracted as dictated by the security processing instructions. The security processing instructions can be configured however desired to support any desired technique for calculating the start/end offsets of the payload, calculation of the initialization vector, and other such calculations. Non-standard protocol layering (e.g., MAC Security Standard (MACsec) over Global Route Header (GRH) or MACsec over IP) may be supported as well via the security processing instructions.

Initialization vectors can be computed by the security processing instructions in accordance with any of a variety of embodiments. For example, the security processing instructions may select 16 bytes from the TID table 106 and another 16 bytes from the packet header (the specific 16 bytes being encoded in the instruction itself and thus configurable). The security processing instructions may form a MACsec initialization vector, for example, as a 16 byte vector as follows:

Bytes [15:8] (8 MSBs) are the Secure Channel Identifier (SCI). These bytes are taken from either the header or constant configuration.
Bytes [7:4] are the Packet-Number, and are taken from header
Bytes [3:0] have a constant 0x1 value For IPsec, the security processing instructions may form the initialization vector generation as follows:

Bytes [15:12]—constant value per connection (connection is identified via source IP address (or other source identifier such as a source MAC address, tunneling tag or UDP source port) and SPI fields); Different values may be stored in different TID table 106 entries, and the parser 102 may select the TID table entry according to the source IP address and SPI fields parsed from the header.

[Bytes 11:4]—taken from the packet

Bytes [3:0]—a constant value from the TID entry

At 406, the configurable security unit 110 performs any one or more of: encrypts the packet, decrypts the packet, signs the packet, authenticates the packet and/or other types of ciphering operations. The security processing instructions may specify the offset to the start and end of the data payload of the packet so that decryption of the packet will occur just on the encrypted data payload. The TID table 106 can be accessed using the TID determined by the protocol and transaction determination unit 104 to access an encryption key associated with the packet's transaction. The encryption and possibly other cryptographic parameters may be retrieved from the TID table 106 and provided to the configurable security unit 110 for decryption of the packet's payload.

At 407, the illustrative method of FIG. 5 further includes writing back information to the TID table 106, in order to prepare for next packet to be ciphered (e.g., decrypted). Such information written back to the TID table 106 may include the next initialization vector to use for the next packet, the next expected LBA, and an updated replay counter.

Figure 6:
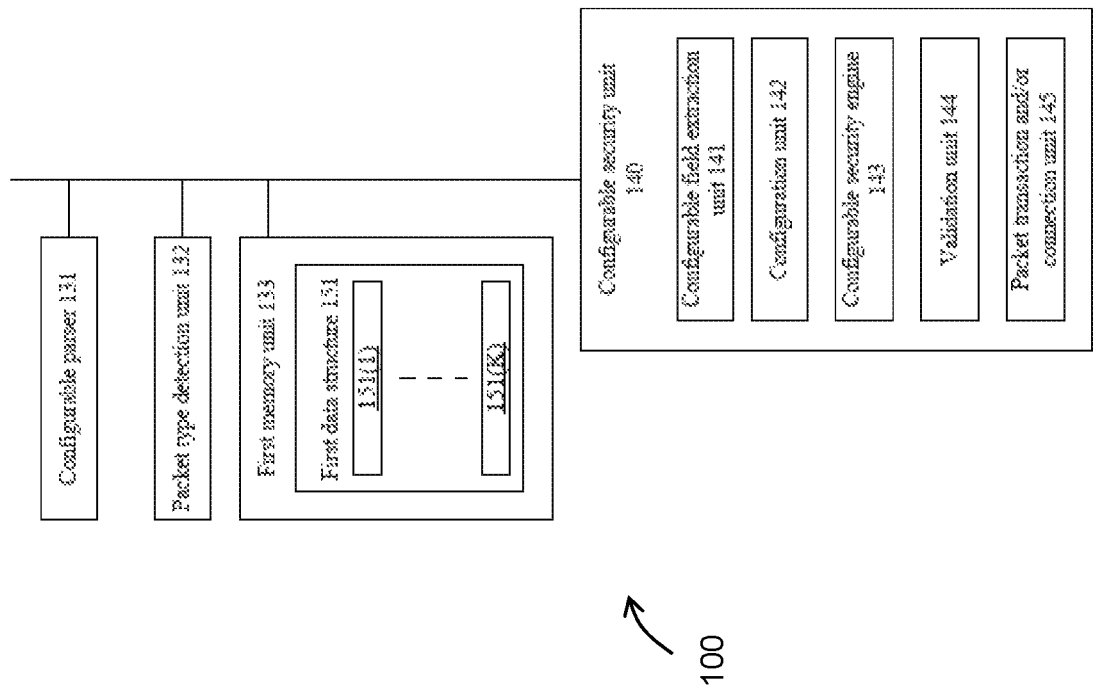
FIG. 6 shows a block diagram of the hardware security accelerator according to various embodiments.

FIG. 6 illustrates another embodiment of the hardware security accelerator 100. In this example, the hardware security accelerator 100 includes a configurable parser 131, a packet type detection unit 132, a first memory unit 133, and a configurable security unit 140. The various components of the hardware security accelerator 100 may be implemented as discrete circuits. In the depicted embodiment, the components of the accelerator 100 are connected by a bus.

The configurable parser 131 may be configured to receive a packet and to extract from the packet one or more headers associated with a set of protocols. The set of protocols include at least one protocol. Examples of the protocols are provided above and include TCP, UDP, IPv4, IPv6, Ethernet, etc. The packet type detection unit 132 is configured to determine a type of the packet from among multiple possible combinations of protocols. The protocols may be standard or protocols or proprietary protocols and the packet type detection unit 132 is configured to determine which of the various possible combination of protocols is present in the packet's headers, and to generate a PTI indicative of the type of the packet. The packet type detection unit 132 may include a CAM which contains various entries, each entry including a combination of protocols and a PTI associated with each protocol combination.

The first memory unit 133 is configured to store multiple sets of security processing instructions. Each set of security processing instructions corresponds to a particular packet type (i.e., particular combination of protocols). Each set of security processing instructions specifies how to access certain parameters from within the corresponding packet for security-related purposes (e.g., to decrypt the packet). The security processing instructions also may include cryptographic keys, and other parameters (such as cipher algorithm, cipher mode, key size, etc.). A set of packet parameters associated with a certain packet may include a type of the certain packet, as well as security-related fields extracted from the packet, a TID associated with the packet, and/or a connection identifier (CID) associated with the packet. A CID refers to an identifier of security parameters for a particular connection. For example, if one node is communicating with 20 other nodes, each node-to-node connection has a unique CID which permits a different set of security parameters (e.g., encryption keys, initialization vectors, packet start/end offsets, etc.) to be used for each such connection. FIG. 6 illustrates K sets of security processing instructions 151(1)-151(K), that are stored in first data structure 151. Separate sets of security processing instructions are associated with different transactions to be operable to facilitate security operations on packets corresponding to the various transactions.

The configurable security unit 140 may perform security processing operations such as encryption or decryption, as well as digital signature generation and/or validation of packets. In the example of FIG. 6 the configurable security unit 40 includes a configurable field extraction unit 141, a configuration unit 142, a configurable security engine 143, a validation unit 144, and a packet transaction/connection unit 145. The configurable field extraction unit 141 extracts from a packet multiple security-related fields. Example of such security-related fields include a TID, an initialization vector or bits used to compute an initialization vector, etc.

The configuration unit 142 configures one or more configurable security engines 143 according to the type of the packet and the content of at least one of the headers extracted from the packet by the configurable field extraction unit 141. Configuring a configurable security engine 143 may include providing control signals to the configurable security engine such as offsets to the beginning and ending of the payload to be ciphered, offsets to and length of the bit fields from which to compute an initialization vector for the ciphering process, etc.

The configurable security engine 143 performs security processing of the packet to provide at least one security result. Examples of such security processing include encrypting the payload in the event the payload is a plaintext data payload, and decrypting the payload in the event the payload is encrypted.

The validation unit 144 is configured to validate one or more fields of the headers that are extracted by the configurable field extraction unit 141. For example, the validation unit 144 may compare a replay counter extracted from the packet to a previous replay counter of a previous packet of the transaction to confirm whether the new replay counter is valid (the replay counter should be greater than the previous replay counter for the counter to be considered valid). The packet transaction/connection unit 145 is configured to determine a transaction/connection associated with the packet unless the packet itself includes a TID or connection identifier (CID) (e.g., in the headers or payload). The connection and/or the transaction associated with the packet can affect the validation process and/or the configuration of one or more configurable security engines 143 and/or the security processing applied by one or more of the configurable security engines.

Figure 7:
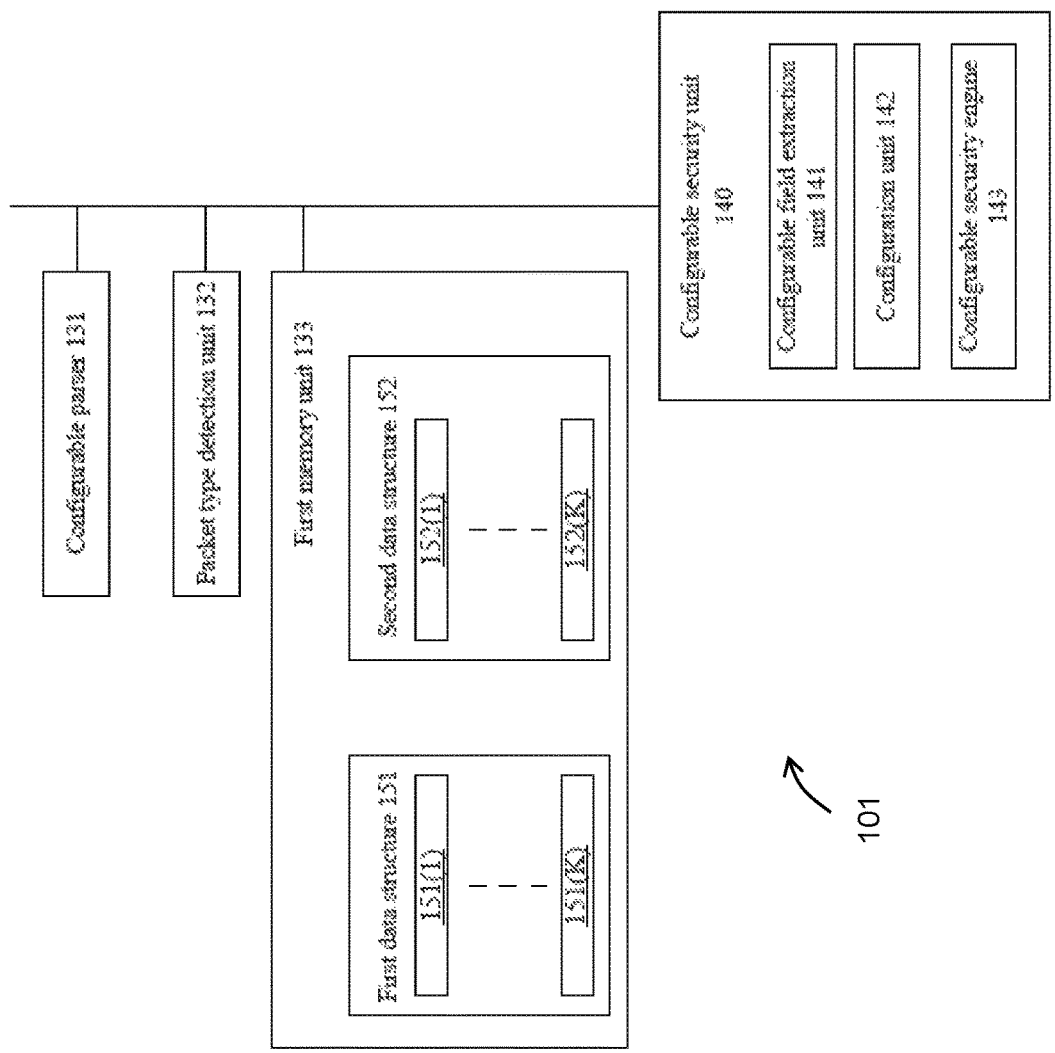
FIG. 7 illustrates another block diagram of the hardware security accelerator in accordance with another embodiment.

FIG. 7 illustrates an example of an embodiment of a hardware security accelerator 101 in which the security processing instructions 151(1)-151(K) included in first data structure 151 may be accessed by retrieving retrieval information (such as a pointer) from a second data structure in response to the type of the packet and/or one or more fields extracted from the packet. The retrieval information from the second data structure is usable to retrieve a set of security processing instructions that is associated with the packet from the first data structure 151. The first memory unit 133 includes the first data structure 151 as well as a second data structure 152. The first data structure 151 includes K sets of security processing instructions. The second data structure 152 includes K units of retrieval information 152(1)-152(K).

Figure 8:
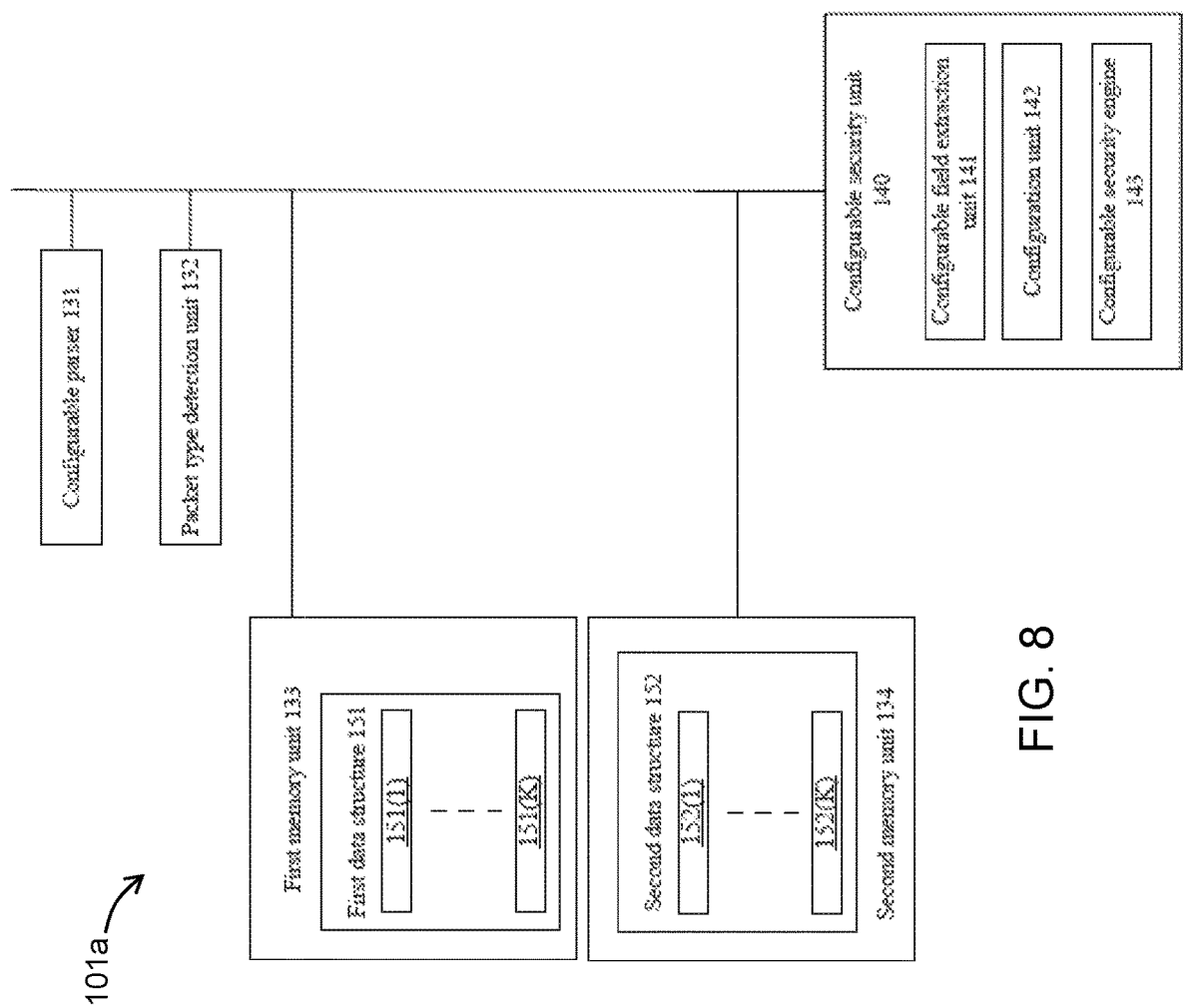
FIG. 8 shows yet another illustrative block diagram of the hardware security accelerator.

In FIG. 7 both the first and second data structures 151 and 152 are stored in the first memory unit 133. FIG. 8 shows an example of a hardware security accelerator 101*a* similar to that of FIG. 7, but the first and second data structures 151 and 152 are stored in separate memory units. In FIG. 8, the first data structure 151 with the security processing instructions 151(1)-151(*k*) is stored in the first memory unit 133, and the second data structure 152 with the K units of retrieval information 152(1)-152(K) is stored in a second memory unit 134. The second data structure 152 may be implemented as a content addressable memory in some embodiments, but may be implemented other than as a content addressable memory in other embodiments, such as an address-addressable memory device. The retrieval information 152(1)-152(K) in the second data structure may include the various combinations of protocols which the hardware security accelerator 100 is configured to detect in each packet's headers, as well as a PTI for each such combination. The PTI can be used as an index into the first data structure 151 to access the corresponding set of security processing instructions to further parse the packet to thereby compute the offsets, lengths, etc. as explained above.

FIGS. 7 and 8 illustrate the configurable security unit 140 as including configurable field extraction unit 141, configuration unit 142 and configurable security engine 143. The configurable security unit of FIGS. 7 and 8 also may include either or both of the validation unit 144 and packet transaction and connection unit 145 shown in FIG. 6.

Referring to the illustrative embodiments of FIGS. 6-8, a packet may be provided to the configurable parser 131 and to the packet transaction/connection unit 145. The configurable parser 131 processes the headers of the packet as explained previously to identify the protocol headers. The identified protocol headers are then provided to the packet type detection unit 132. The packet type detection unit 132 identifies the type of packet and outputs a packet type identifier PTI indicative of the type of packet.

The PTI is provided by the packet type detection unit 132 to the first memory unit 33 to retrieve the corresponding set of security processing instructions. The packet transaction unit 145 also may process the packet to detect a transaction associated with the packet 400. The packet transaction unit 145 outputs a TID. The TID from the packet transaction unit 145 may be sent to first memory unit 133 and may be used (along with other parameters such as the PTI) to access the relevant set of security processing instructions. Additionally or alternatively, the TID may be sent to configuration unit 142 and/or to configurable security engine 143. Based on the TID, some or all relevant security information is obtained such as encryption keys. The first memory unit 133 may include the TID table as well as security processing instructions for controlling the configurable security engine 143 to perform a cipher process. The first memory unit 133 may be accessed using the PTI and/or the TID and/or any field extracted from the packet. In response, the first memory unit 133 may output one or more security processing instructions of a relevant set of security processing instructions associated with the PTI and/or cryptographic parameters associated with the TID.

At least one security processing instruction of the relevant set is sent to one or more of the configuration unit 142, the configurable security engine 143, and the configurable field extraction unit 141. A security processing instruction may, for example, indicate the bit location of a particular field of the packet's headers. The field targeted by the instruction may be, for example, the data payload of the packet. In response to the security processing instruction, the configurable field extraction unit 141 may extract that particular field and send the extracted bit field to the configuration security engine 143. In another example, the bit field that is to be extracted from the packet may be any one or more of the following security fields: a TID, a CID, an epoch value, a packet sequence number, an LBA, a replay counter, an encryption start offset, an encryption end offset (from end of packet (EOP)), an authentication start offset, an authentication end offset (from EOP), and a protection information size and repetition. The extracted field may also include an initialization vector or fields from which the initialization vector is to be computed.

The configurable security engine 143 may receive the payload of the packet as extracted by the configurable field extraction unit 141 and then encrypt or decrypt it. The configurable security engine 143 may be configured to perform the encryption or decryption according to one or more of the cryptographic parameters retrieved from the TID table as well as various of the fields extracted from the packet headers that contain security-related information necessary for the ciphering process.

Figure 9:
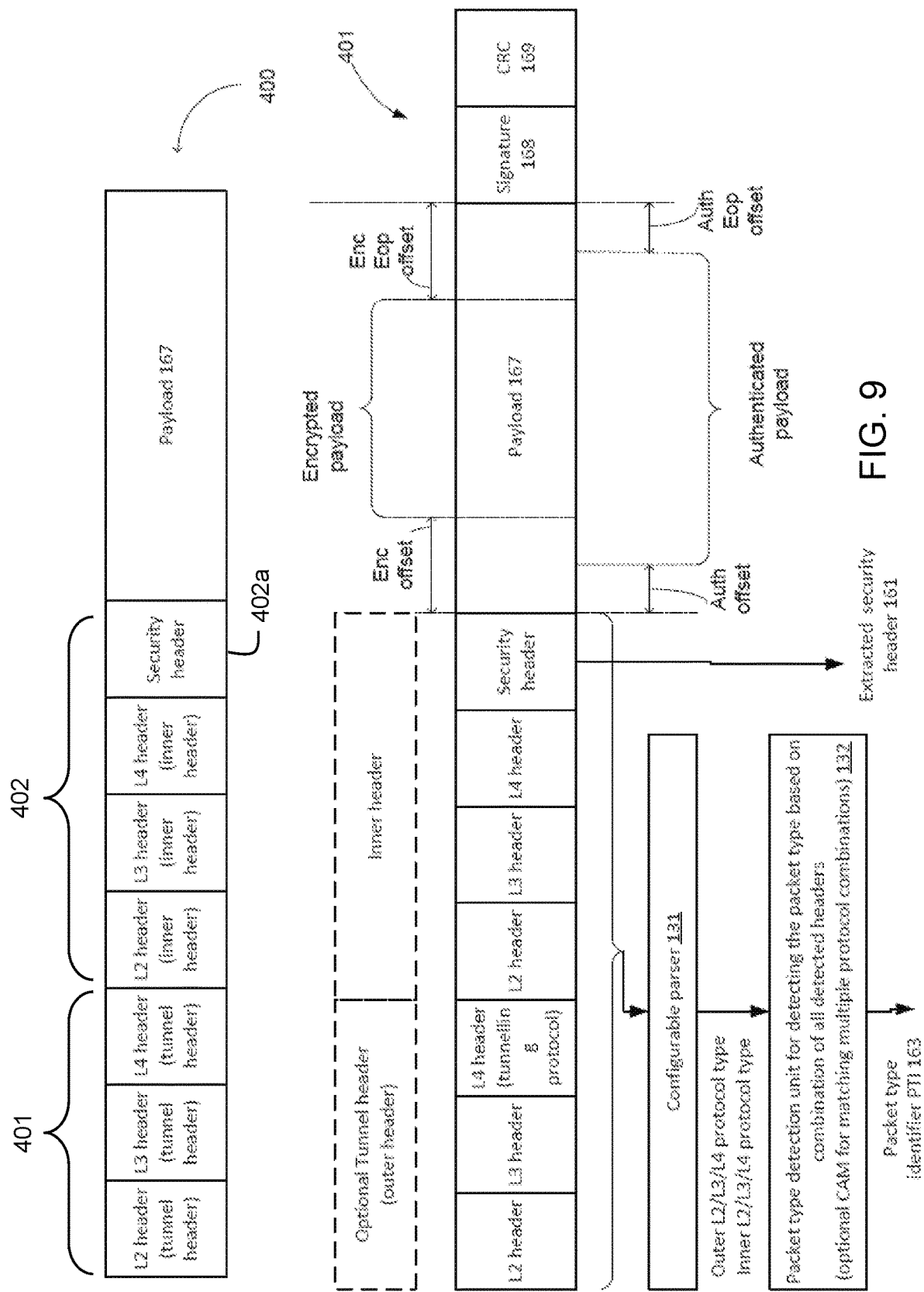
FIG. 9 illustrates an example of the portions of an illustrative packet and how those portions are processed by the hardware security accelerator of various embodiments.

FIG. 9 illustrates an exemplary embodiment of a packet 400. The packet 400 includes an outer header 401 and an inner header 402, along with the payload 167, a signature 168, and a cyclic redundancy check (CRC) code 169. The outer header 401 may include second, third and fourth layer headers (L2 header, L3 header, L4 header) and the inner header 402 may include second, third and fourth layer headers (L2 header, L3 header, L4 header) as well as a security header 402*a*. The security header 402*a* may be part of the inner header 402 as shown, or may be part of he outer header 401. The different protocol headers (second layer, third layer, and security header) are parsed by configurable parser 131 and the packet type detection unit 132 determines the type of the packet based upon the combination of headers included in packet 400. In some examples, the security header 402*a* may include one or more of the fields listed above such as: a transaction identifier, a connection identifier, an epoch value, a packet sequence number, an LBA, an initialization vector (or fields from which to compute the initialization vector), a replay counter, an encryption start offset, an encryption end offset (from EOP), an authentication start offset, an authentication end offset (from EOP), and protection information size and repetition.

The encryption offset is the offset to the beginning of the payload to be encrypted or decrypted. The encryption offset can be extracted or calculated in various manners based on a security processing instruction. For instance, the encryption offset may be extracted from the security header by, for example, the configurable field extraction unit 141. In another example, the encryption offset can be calculated using a configurable security engine to add a constant to the total combined length of inner and outer headers. The hardware security accelerator 100 is flexible enough to be used with a variety of packet types and protocols. In one protocol example, the first byte of the payload contains the TID. In this example, the offset to the beginning of the payload is calculated as the total combined length of the headers incremented by 1. In yet another example, the offset can be stored in and thus retrieved from the TID table 106.

In the IPSec protocol, a portion of the data is defined that is authenticated, and another internal portion of the data is encrypted. The sum of the Security Parameters Index (SPI) and the Sequence Number is passed to the receiver of the packet, and the receiver uses them to generate the same cryptographic initialization vector that was used when initially encrypting the data. For assurance that an attacker is not able to forge the sum of the SPI and the Sequence Number, such values are digitally signed so that the receiver can make sure that no one changed these fields, prior to processing the data. Thus, FIG. 9 illustrates a portion of the packet that is to be authenticated along with the relevant authentication offsets.

The following discussion includes examples of fields that are extracted, how the fields cause the configuration unit 142 to configure a configurable security engine 143, and how configurable security engine 143 operates.

Protocol Example 1

IPsec (IP Security). The fields to be extracted by the parser include the source IP address which is one of the IP header fields and which is used to generate a CID for accessing a CID table to obtain a TID. The TID is then used to access the TID table 106, which then reveals many of the security parameters needed by the configurable security engine 143, such as where to start encryption/decryption (decryption start offset), when to end encryption/decryption (decryption end offset), which cipher algorithm to use, which cipher keys to use, etc. Another field to be extracted from the packet's headers includes the Security Parameters Index (SPI) which is one of the IPsec header fields). The SPI is used together with Source IP address to generate a Sequence Number (one of the IPsec header fields) and is used to generate the initialization vector.

Protocol Example 2

DTLS (Datagram Transport Layer Security). The fields to be extracted by the parser include the source IP address, the source port, the sequence number, and the epoch value. The source port is one of the UDP header fields and is used with source IP address to generate a CID for accessing the CID table. The sequence number is one of the DTLS header fields and is used with the epoch value (one of the DTLS header fields) to generate the initialization vector.

Protocol Example 3

A proprietary protocol. In an illustrative proprietary protocol, the security header can directly hold the TID. The parser may extract the TID (one of the fields in the proprietary security header) for accessing the TID table. The parser may also extract the initialization vector which may be one of the fields in the proprietary security header.

Regardless of the particular protocol used, after the headers are extracted and the relevant fields are extracted from the headers based on the detected protocols, the configuration unit 142 loads the configurable security engine 143 with the relevant cipher keys, and configures it with the relevant cipher algorithm. Examples of cipher algorithms include the Advanced Encryption Standard (AES), the Data Encryption Standard (DES), the Triple Data Encryption Standard (Triple-DES), etc. Examples of cipher modes include Electronic Codebook (ECB), Cipher Block Chaining (CBC), Counter (CTR), Galois/Counter Mode (GCM), etc. Further, the configuration unit 142 configures the security accelerator with the relevant authentication (e.g., digital signature) mode and the signature size. AES-Cipher-based Message Authentication Code (CMAC), AES-GMAC, Secure Hash Algorithm (SHA)-2, SHA-3, etc. In addition, the configuration unit 142 also determines if the packet is to be encrypted/decrypted, signed/authenticated, and the direction (i.e., encrypt vs decrypt, sign vs. authenticate).

In addition to the above configuration, the configuration unit 142 also may break the packet into several fields such as the headers, the unsecured trailer (that portion of the packet from the end of the secured payload to EOP), and the encrypted payload portion of the packet that should be encrypted/decrypted.

Figure 10:
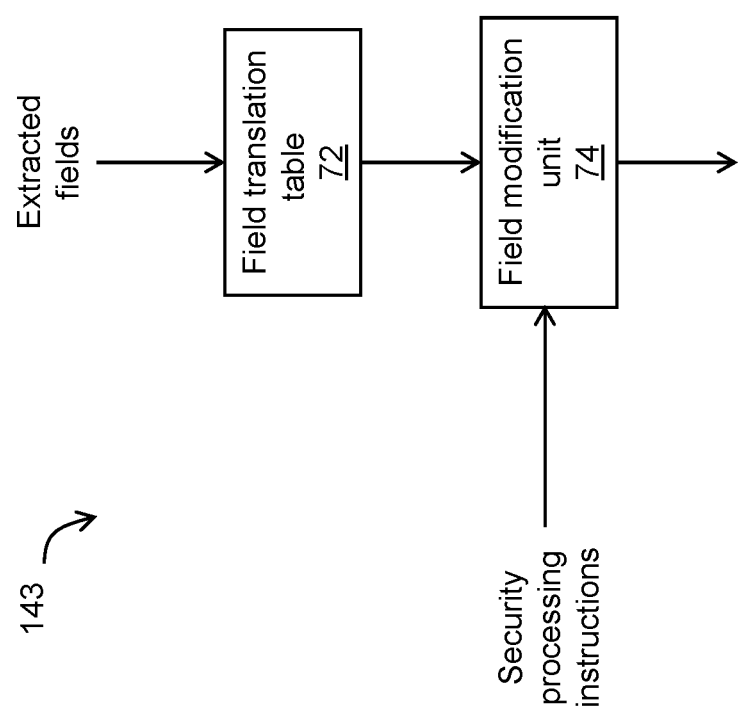
FIG. 10 illustrates a block diagram of a security engine usable in the hardware security accelerator of the various embodiments.

FIG. 10 illustrates an example of a configurable security engine 143. The illustrative configurable security engine 143 includes a field translation table 72 and a field modification unit 74. The field translation table 72 is used to translate an extracted field (from configurable field extraction unit 141) if and as desired. The field modification unit 74 may perform calculations, based on the security processing instructions provided to it. Such calculations may include calculating the next initialization vector, the next sequence number, and/or the replay counter based upon the extracted field or a translated field from field translation table 72. For example, the for MACsec, the header length may be used as an authentication start offset (i.e., offset to a byte to begin authentication, for example, a digital signature). By way of an additional example, the a value such as 16 may be added to the header length to form the authentication offset value, The field medication unit performs such calculations. The field modification unit 74 may be implemented as an arithmetic logic unit (ALU) comprising adders, subtractors, Boolean operators, multiplexers, etc.

Figure 11:
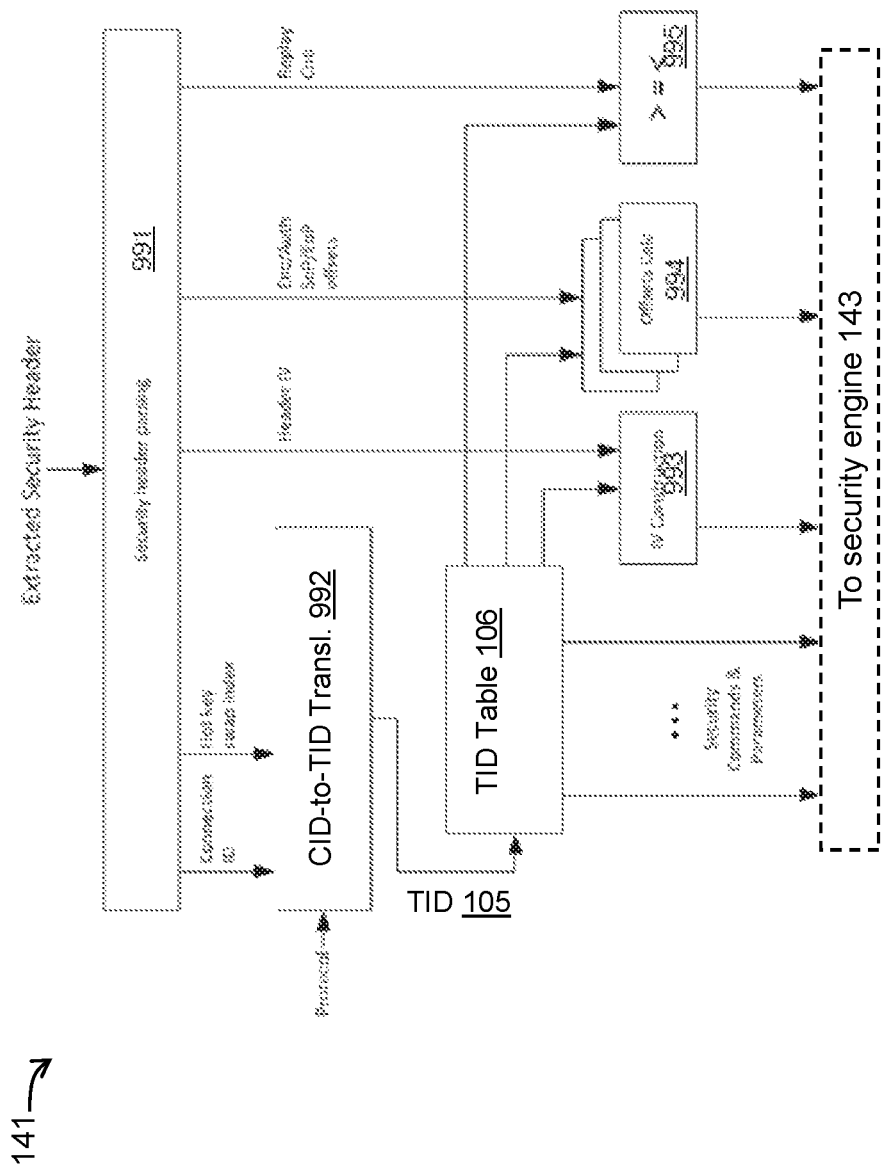
FIG. 11 shows an example of a block diagram of a configurable extraction unit usable in the hardware security accelerator of the various embodiments.

FIG. 11 illustrates an embodiment of the configurable extraction unit 141. The illustrative configurable extraction unit 141 in the example of FIG. 11 includes a security header parsing unit 991, a CID-to-TID Translator 992, a TID table 106, an initialization vector construction unit 993, an offsets calculator 994, and a comparator 995 (denoted >=<). The security header parsing unit 991 is coupled to the CID-to-TID Translator 992, the initialization vector construction unit 993, offsets calculator 994, and comparator 995. The TID table 106 is coupled to initialization vector construction block 993, offsets calculator 994 and comparator 995.

The CID-to-TID Translator 992 receives a CID, a hot key swap index, and a protocol identifier (e.g., PTI 103) and generates a TID 105 to be sent to the TID table 106. The hot swap index indicates whether an old encryption is to be used or a new encryption key is to be used. For example, for MACSec connections, encryption keys are changed periodically. The hot swap index may be, for example, a 0 to indicate that the old key is to be used and 1 to indicate that a new encryption key is to be used. In MACSec, the "association number" in the header functions as the hot swap index. The protocol identifier (PTI 103) also is provided to the CID-to-TID Translator 992 because different protocols (e.g., MACSec, IPSec) use different header fields to determine the CID. Thus, the PTI 103 is used as another input to assure that each protocol has a different set of CIDs. The CID-to-TID Translator 992 may be implemented as a CAM and maps CIDs extracted from the headers, based on the PTI 103, to a TID 105. Two different TID entries are included in the TID table 106 for the old/new encryption keys as discussed above. As such the hot key swap index also used to map the CID to the correct TID entry in the TID table 106.

The offsets calculator 994 is configured to calculate offsets by adding a constant to the inner/outer L2/L3/L4 header offset, and optionally adding the header length as well. The size of the increment can be any number depending on the type of the packet.

The comparator 995 is configured to compare two numbers, with an accept/reject rule. For example, the packet replay counter may be extracted from the headers, and the comparator 995 may compare it to the last accepted replay counter (stored internally). If the new replay counter is greater than the last accepted replay counter, the packet is accepted; otherwise the packet is dropped.

In various embodiments, any of the disclosed technologies such as the hardware security accelerator 100 may be implemented as part of a microprocessor, an application-specific integrated circuit (ASIC), a system-on-a-chip (SoC), a field-programmable gate array (FPGA), a peripheral devices such as an expansion card, or another type of hardware.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing detailed description, numerous specific details are set forth in order to provide a thorough understanding of the disclosed technologies. However, it will be understood by those skilled in the art that some embodiments may be practiced without these specific details. In other instances, well-known methods, procedures, and components have not been described in detail so as not to obscure the disclosure. Numerous variations and modifications will become apparent to those skilled in the art once the above disclosure is fully appreciated. It is intended that the following claims be interpreted to embrace all such variations and modifications.

What is claimed is:

1. A hardware security accelerator for processing a packet, comprising:
   a memory containing a transaction identifier (TID) data structure that is configurable to store respective cryptographic parameters for multiple TIDs;
   a protocol and transaction determination unit configurable to:
     for a read packet to be transmitted to a storage system, update a TID data structure for the read packet to include a mapping of a TID for the read packet to a read address contained in the read packet; and
     extract a TID from a return packet from the storage system and access the TID data structure using the extracted TID to generate controls signals based on protocols of headers and a read address mapped to the TID in the TID data structure; and
   a configurable security unit configured to cipher the packet according to the determined protocols of the headers and according to cryptographic parameters from the TID data structure for the TID for the packet;
   wherein upon ciphering the packet, the protocol and transaction determination unit is configurable to modify the read address in the TID data structure to generate a next expected read address; and wherein the protocol and transaction determination unit and the configurable security unit are implemented using at least a hardware circuit.

2. The hardware security accelerator of claim 1, wherein the cryptographic parameters include encryption keys.

3. The hardware security accelerator of claim 1, wherein the protocol and transaction determination unit includes multiple security processing instructions which cause cryptographic parameters to be determined for a given packet.

4. The hardware security accelerator of claim 3, wherein the configurable security unit is configured to retrieve a set of security processing instructions based on the determined protocols of headers and to cipher the packet based on the retrieved the security processing instructions.

5. The hardware security accelerator of claim 1, wherein the hardware security accelerator is part of a microprocessor, an application-specific integrated circuit (ASIC), a system-on-a-chip (SoC), a peripheral device, or a field-programmable gate array (FPGA).

6. An integrated circuit (IC), comprising:
   a packet type detection circuit that is configurable to determine a type of a packet based on header portions of the packet, and to generate a packet type identifier of the packet;
   a security circuit configured to perform security processing of the packet to provide a security result; and
   a configuration circuit arranged to extract a transaction identifier (TID) from a read response packet, to use a TID data structure to map the extracted TID to a read address to determine a cryptographic parameter based on the read address, and to configure the security circuit according to the type of the packet and according to the cryptographic parameter.

7. The IC according to claim 6, further comprising a memory unit configured to store a first data structure that includes sets of security processing instructions, wherein different sets of security processing instructions are associated with packets associated with different sets of packet parameters, and wherein each set of packet parameters comprises a packet type.

8. The IC according to claim 7, wherein the memory units is further configured to store, in a second data structure, retrieval information for retrieving from the first data structure a set of security processing instructions for the packet.

9. The IC according to claim 8, wherein the retrieval information includes combinations of protocols and a packet type indicator for each combination, the packet type indicator forming an index into the first data structure which the security circuit is configured to use to access the security processing instructions corresponding to the packet type indicator.

10. The IC according to claim 9, wherein the memory unit is a content addressable memory (CAM) that stores the combinations of protocols, a source identifier, a transaction our connection identifier, and the packet type indicator for each combination, and is operable to map source identifiers to the corresponding transaction or connection identifier.

11. The IC according to claim 7, further comprising a packet transaction unit configured to determine a transaction associated with the packet, and wherein separate sets of security processing instructions are associated with packets of different transactions.

12. The IC according to claim 7, further comprising a packet transaction unit configured to determine a connection associated with the packet, and wherein different sets of security processing instructions are associated with packets associated with different connections.

13. The IC according to claim 7, further comprising a field extraction unit that is configurable to extract security parameters embedded within the packet in response to a first security processing instruction stored in the first data structure.

14. The IC according to claim 6, wherein the security processing includes packet encryption, packet decryption, digital signature generation, or digital signature validation.

15. The IC according to claim 6 wherein the security circuit is configured to determine, based on the packet type identifier, an offset to a data payload of the packet.

16. The IC according to claim 6 wherein the security circuit is configured to determine, based on the packet type identifier, an offset to a data payload of the packet, the offset computed by the security circuit as a combined length of the headers incremented by a predetermined number associated with the packet type identifier.

17. A hardware circuit-implemented method, the method comprising:
  determining protocols of headers of a packet;
  for a read packet to be transmitted to a storage system, updating a transaction identifier (TID) data structure for the read packet to include a mapping of a TID for the read packet to a read address contained in the read packet;
  extracting a TID from a return packet from the storage system and accessing the TID data structure using the extracted TID to generate controls signals based on the determined protocols of the headers and a read address mapped to the TID in the TID data structure;
  performing, by a configurable security engine, a security processing of the packet according to the determined protocols of the headers and according to cryptographic parameters from the TID data structure for the TID for the packet; and
  modifying, by a hardware circuit, the read address in the TID data structure to generate a next expected read address.

18. The method of claim 17, further comprising retrieving a set of security processing instructions from a memory unit, the retrieved set of security processing instructions mapped to a packet type.

19. The method of claim 18, further comprising determining an initialization vector based on the set of security processing instructions.

20. The method of claim 17, wherein performing security processing of the packet includes encrypting, decrypting a payload of the packet, generating a digital signature, or validating a digital signature.

* * * * *

UNITED STATES PATENT AND TRADEMARK OFFICE
CERTIFICATE OF CORRECTION

PATENT NO. : 10,708,241 B1
APPLICATION NO. : 16/275824
DATED : July 7, 2020
INVENTOR(S) : Ron Diamant et al.

Page 1 of 1

It is certified that error appears in the above-identified patent and that said Letters Patent is hereby corrected as shown below:

In the Claims

Column 16, Line 9, Claim 4:
Delete: "retrieved the security processing instructions"
Insert --retrieved security processing instructions--

Column 16, Line 50, Claim 10:
Delete: "our connection identifier, and the packet type indicator for"
Insert --or connection identifier, and the packet type indicator for--

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*